United States Patent [19]
Gaudebout et al.

[11] 3,763,850
[45] Oct. 9, 1973

[54] DEVICE FOR MEASURING THE PARTIAL PRESSURE OF A GAS IN A FLUID

[75] Inventors: Claude Gaudebout, Paris; Jean-Fred Quercy, Saint-Cloud, both of France

[73] Assignee: Hoffmann-La Roche Inc., Nutley, N.J.

[22] Filed: Dec. 29, 1971

[21] Appl. No.: 213,775

[30] Foreign Application Priority Data

Dec. 31, 1970 France ..................... 7047495

[52] U.S. Cl. ............ 128/2 E, 128/2.1 E, 204/195 B
[51] Int. Cl. .............................................. A61b 5/05
[58] Field of Search ................. 128/2 E, 2 R, 2 L, 128/2.1 E, 2.06 E, 2.06 R; 204/195 P, 195 R, 195 W, 195 B

[56] References Cited
UNITED STATES PATENTS

| | | | |
|---|---|---|---|
| 3,572,322 | 3/1971 | Wade | 128/2.06 |
| 3,565,060 | 2/1971 | Sipple | 128/2.06 |
| 3,450,619 | 6/1969 | Kruse et al. | 204/195 R |
| 3,259,124 | 7/1966 | Hillier et al. | 128/2.1 E |
| 3,696,007 | 10/1972 | Bennett et al. | 204/195 W X |
| 3,682,159 | 8/1972 | Imredy et al. | 128/2 E |
| 3,574,078 | 4/1971 | Hynes et al. | 204/195 P |
| 3,668,101 | 6/1972 | Bergman | 204/195 P |
| 3,628,527 | 12/1971 | West | 128/2.06 B |

FOREIGN PATENTS OR APPLICATIONS 941,436 11/1963 Great Britain ............... 204/195 W

OTHER PUBLICATIONS

IEEE Trans. on Bio–Med. Engineering, Vol. BME 17, No. 3, July 1970, pp. 238–247.

*Primary Examiner*—Kyle L. Howell
*Attorney*—Samuel L. Welt et al.

[57] ABSTRACT

A device for measuring the partial pressure of a gas in a liquid or gaseous fluid, and more particularly, the partial pressure of oxygen in the blood comprising, a wafer having surface elements in a manner of a thin-layer integrated circuit defining a pair of electrodes and a reference electrode. The device is secured to a catheter tip by a casing whereby an electrolyte fluid is introduced between the casing and the measuring device.

6 Claims, 3 Drawing Figures

PATENTED OCT 9 1973　3,763,850
FIG. 1
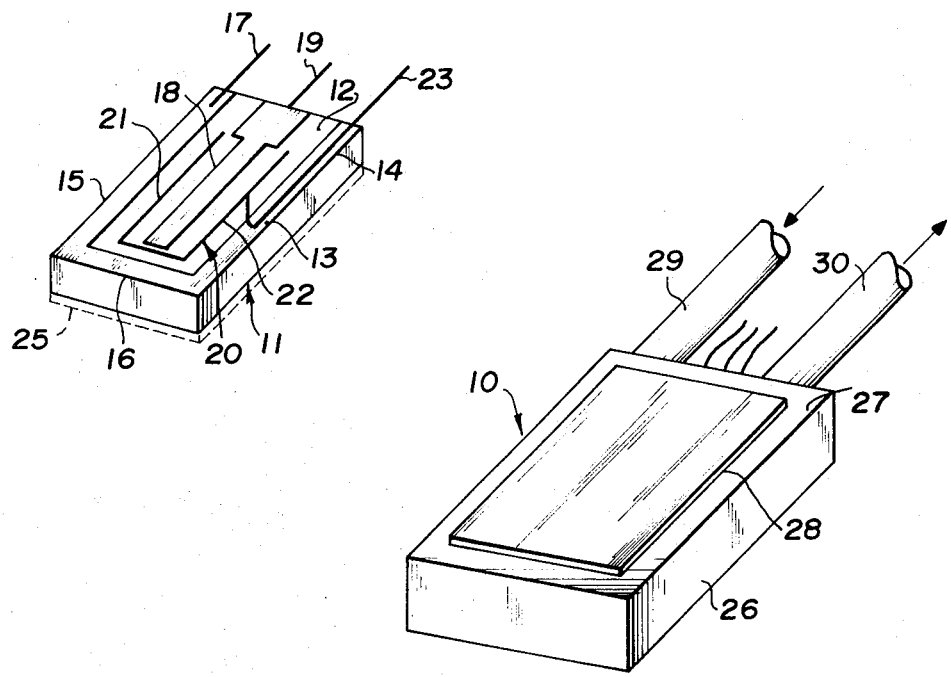
FIG. 2
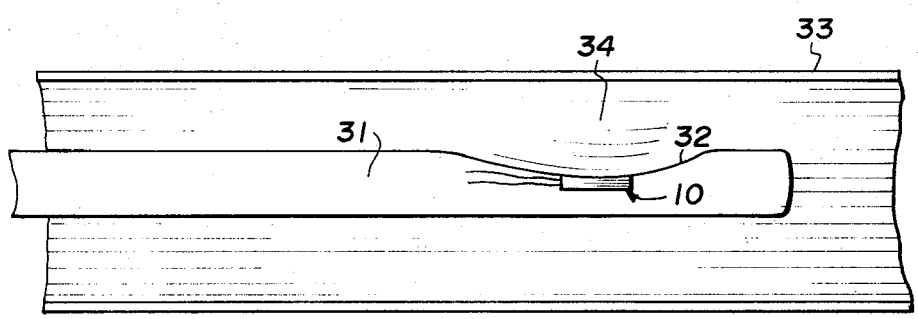
FIG. 3

DEVICE FOR MEASURING THE PARTIAL PRESSURE OF A GAS IN A FLUID

BACKGROUND OF THE INVENTION

This invention relates to a device for measuring the partial pressure of a gas in a liquid or gaseous fluid, and more particularly for measuring of the partial pressure of oxygen in the blood.

In the measurement of the partial pressure of a gas dissolved in a liquid, techniques such as the polarographic procedure are known wher the current flowing in the cathode of a pair of electrodes immersed in the liquid, is measured. This current is substantially proportional to the concentration of the gas dissolved in the liquid for a given polarization voltage.

When such a procedure is applied to an electrolytic liquid of variable temperature, a temperature sensor is associated with the pair of electrodes to provide compensating indications, in a known manner, of the results furnished by the measuring device.

In addition, and in order to take into account the aging of the anode as well as its electrochemical modification under the influence of the current which passes through it, the devices for putting into effect the polarographic procedure generally comprise a reference electrode determining the potential of the electrolyte with respect to the cathode.

When the procedure is applied to the measurement of the oxygen partial pressure of the blood, the electrolyte in which the electrodes are immersed is not the blood itself, but an electrolyte the oxygen concentration of which at any moment is equal to that of the blood by interposition of a membrane permeable to oxygen, for example of polytetrafluoroethylene (Teflon) between the electrolyte and the blood.

The above conditions, imposed by the principle of measurement, entail relatively cumbersome devices which are of delicate and expensive construction.

SUMMARY OF THE INVENTION

It is the purpose of the present invention to provide a measuring device, particularly useful for the measurement of the oxygen partial pressure of the blood and which overcomes the inconveniences of known devices, which is reliable for the measurement in view of the partial pressure of oxygen in the blood, and which is capable of being manufactured with good characteristics of reproducibility and not necessitate prior standardization for all the devices of the same series. It is another purpose of the present invention to provide a device which permits the measurement in vivo in better conditions than those possible up to the present, in particular, insofar as it concerns the influence of the blood-flow in which the device is immersed.

To accomplish the above the device, in accordance with the present invention, is characterized in that the electrodes are made in the form of surface elements in the manner of a thin-layer integrated circuit. Thin-layer integrated circuits production techniques can be used according to the invention, not only for the fabrication of the measuring cathode and anode but also for the reference electrode for determining the potential of the electrolyte with respect to the cathode.

Further, the temperature sensor generally associated with the pair of measuring electrodes, is made as a flat element secured, for example, by gluing, on the face of the substrate opposite to that carrying the electrodes.

In one embodiment, the temperature sensor is a thermistor obtained by disposition of a thin-layer of a semi-conductor material on the substrate surface opposite to that on which the electrodes are disposed. The resulting device can readily be used for localized and precise measurements in positions which were hitherto difficult to reach, for example, near the pulmonary veins of a patient.

BRIEF DESCRIPTION OF THE DRAWINGS

FIG. 1 is a schematic view, in perspective, of a group of electrodes of a device according to the invention;

FIG. 2 is a perspective view of the device in accordance with the invention;

FIG. 3 is a rough schematic view of the device housed in a catheter which is illustrated as being immersed in a blood vessel.

DESCRIPTION OF THE PREFERRED EMBODIMENT

With reference to FIG. 1 there is shown a device 10, for measuring the partial pressure of a gas in a liquid or gaseous fluid. A wafer chip 11, for example of silicon, supports the electrodes which are formed thereon by known fabrication techniques of thin-layer integrated circuits.

In the embodiment illustrated, the wafer 11 is of rectangular outline with a large face 12 on which is attached an anode 13, for example of silver, in the form of a U-shaped strip along the long sides 14 and 15 of the face 12 and along the short side 16; a lead 17 being connected to the anode 13.

The cathode 20 is formed by deposition of a conductor metal, for example of gold or platinum on the face 12 in the form of a U, its arms 21 and 22 laying parallel to the edges 14 and 15, disposed inside the area bound by the anode 13. A conductor 23 is connected to the cathode 20.

On the face 12 of the plate 11 there is likewise a strip 18, for example of silver chloride, disposed on the surface 12 along the central longitudinal plane of the face and is joined to a lead 19. The strip 18 constitutes a reference electrode.

The thermistor for the temperature correction of the electrolyte into which the electrodes are immersed is formed by a flat element 25, advantageously a thin layer of a semiconductor material, deposited on the face opposite to the face 12, as shown by the broken lines in FIG. 1.

When the device is intended for the measurement of the oxygen partial pressure of the blood, the system comprising the electrodes and thermistor represented in FIG. 1, is housed in a parallel pedal casing 26 shown in FIG. 2, having dimensions slightly greater than those of the plate 11 so as to leave intermediate the walls of the case and the plate a space for receiving an appropriate electrolyte, introduced into the the casing 26 through via a conduit 29 and which is discharged therefrom by means of a conduit 30.

A membrane 28 which is permeable to oxygen, such as a membrane of Teflon 28 of small thickness (in general of the order of a few microns), is secured to one of the larger faces of the casing 26, for example by gluing, to the top surface 27.

The shape and dimensions of the device according to the invention, enable it to be readily accommodated in a catheter 31 (FIG. 3) the casing of which is shaped, as shown in 32, so as to form a depression at the place where device 10 is secured, so that the blood flow in the vessel 33, into which the catheter is introduced, is only slightly modified, thus limiting the fibrination of the blood and the deposition of small clots on the membrane 28, which would otherwise render the latter useless.

The mounting of the device 10 in catheter 31 in the manner described and represented, avoids possible damage to the device on introduction of the catheter into the vessel 33. In addition, it ensures that the membrane 28 is always bathed by the blood 34 in such a manner so that it is the partial pressure of oxygen dissolved in the blood which is measured.

The fabrication of the electrodes by the technique of thin-layer integrated circuits assures a good reproducibility of the characteristics of the devices from the same production line, particularly as regards the relative distances between adjacent electrodes, so that standardization is not necessary for each device but simply for just one of them.

We claim:

1. A device for use in measuring the partial pressure of a gas in a liquid or gaseous fluid and more particularly the partial pressure of oxygen in the blood, comprising:
    wafer means including a thin-layer surface integrated circuit defining a pair of electrochemical sensor electrodes;
    selective membrane means permeable to oxygen, covering said sensor electrodes;
    an electrolyte layer disposed between said sensor electrodes and said membrane means; and,
    lead means for electrical connection of said integrated circuit to a measuring instrument.

2. A device according to claim 1:
    said integrated circuit circuit including a reference electrode; and,
    temperature sensor means secured to said wafer means.

3. A device according to claim 2, whereby the temperature sensor means is a thermistor mounted on a surface of said wafer means.

4. A device according to claim 2, whereby said wafer means is of silicon and said temperature sensor means is a thermistor deposited on one face of the wafer means in the form of a thin-layer of a semi-conductor material.

5. A device according to claim 1 including: means defining with said membrane means a casing for enclosing said wafer means whereby said casing is of larger dimensions than said wafer means for accommodating an electrolyte therebetween; and,
    conduit means connected to said casing for receiving and evacuating the electrolyte with regard to the casing.

6. A catheter device for use in measuring in vivo the partial pressure of oxygen of the blood comprising:
    a catheter;
    wafer means having a thin-layer surface integrated circuit defining a pair of electrochemical sensor electrodes ad a reference electrode;
    casing means for enclosing said wafer means within an electrolyte fluid and including selective membrane means permeable to oxygen covering said sensor electrode; and
    said catheter having a depression along its longitudinal wall at which the casing means is secured and the membrane exposed; and
    lead means for electrical connection of said electrodes to a measuring instrument.

* * * * *